United States Patent [19]

Tayefeh

[11] Patent Number: 5,105,415
[45] Date of Patent: Apr. 14, 1992

[54] DETECTING MAGNETOOPTIC AND INTENSITY-MODULATED OPTICAL SIGNALS WITH THE SAME DETECTOR

[75] Inventor: Morovat Tayefeh, Tucson, Ariz.

[73] Assignee: International Business Machines Corporation, Armonk, N.Y.

[21] Appl. No.: 448,450

[22] Filed: Dec. 11, 1989

[51] Int. Cl.$^5$ .............................................. G11B 7/00
[52] U.S. Cl. ...................................... 369/110; 369/54
[58] Field of Search ................ 369/110, 54, 106, 109, 369/13

[56] References Cited

U.S. PATENT DOCUMENTS

| | | | |
|---|---|---|---|
| 4,337,534 | 6/1982 | Basilico et al. | 369/111 |
| 4,446,548 | 5/1984 | Bouwhuis et al. | 369/109 |
| 4,617,654 | 10/1986 | Gross et al. | 369/46 |
| 4,688,203 | 8/1987 | Koishi et al. | 369/48 |
| 4,691,308 | 9/1987 | Takagi et al. | 369/13 |
| 4,750,163 | 6/1988 | Yamamiya et al. | 369/54 |
| 4,785,167 | 11/1988 | Madrid | 250/214 A |
| 4,823,220 | 4/1989 | Milster et al. | 369/110 |
| 4,833,662 | 5/1989 | Yoda | 369/110 |
| 4,847,824 | 7/1989 | Davie | 369/110 |
| 4,953,124 | 8/1990 | Koyama | 369/110 |

FOREIGN PATENT DOCUMENTS 59-272664 6/1985 Japan .

OTHER PUBLICATIONS

Electronic Design News, Nov. 26, 1987, p. 231.
Hamamatsu Photo Diode Application Example, p. 40, Mar. 1987.

Primary Examiner—Roy N. Envall, Jr.
Assistant Examiner—Nabil Hindi
Attorney, Agent, or Firm—H. F. Somermeyer

[57] ABSTRACT

A magnetooptic player reads magnetooptically recorded signals on a disk by using a differential detector. Intermediate areas on a storage member used to store the magnetooptically record signals are sector marks and ID fields formed by undulations in the surface of the disk. Such sector marks and ID fields are read by detecting the intensity modulation in a reading light beam; for detecting such embossed marks and D-ROM disks, one-half of the differential detector is disabled for facilitating such detection in a differentially arranged detector.

12 Claims, 1 Drawing Sheet

DETECTING MAGNETOOPTIC AND INTENSITY-MODULATED OPTICAL SIGNALS WITH THE SAME DETECTOR

FIELD OF THE INVENTION

Present invention relates to optical devices, particularly those optical devices useful for recording and storing information-bearing signals.

BACKGROUND OF THE INVENTION

Many magnetooptic disks, of the so-called hard-sectored type, such hard-sectored disks usually include molded surface perturbations for indicating the sector boundaries. These surface perturbations also indicate sector addresses and other control information. Such surface perturbations intensity modulate a laser beam that impinges on the perturbations for providing a detectable readback signal. In the data portions of a magnetooptic (MO) disk, the surfaces are smooth, yielding a constant intensity reflected light and readback signal. The information recorded in the MO data portions is represented by remanent magnetization of either one or second polarity at the reading and recording surface. As is well known, a light reflected by a magnetooptic recording layer rotates the linear polarization of the impinging light beam in accordance with the remanent magnetization, creating p and s polarization components. The components are separated in a readback optical system, such that the p component impinges upon a first photodiode, while the s component impinges upon a second photodiode. The difference in signal between the two photodiodes is representative of the recorded information.

It is desired to use but one circuit to read both the intensity modulation and the MO modulated signals. In many differential detection circuits the intensity of the signal going on one diode can be made equal to the other diode, such that the differential signal is zero. Therefore, intensity modulation cannot be readily and reliably detected. In a similar vein, if there is intensity modulation of an MO signal, detection also becomes more difficult.

SUMMARY OF THE INVENTION

It is an object of the invention to provide an optical signal detector capable of detecting both polarization-modulated light beams and intensity-modulated light beams and to rapidly switch between the two detection modes.

In an optical detector, such as one used in a magnetooptic disk player, the detector can detect magnetooptic polarization rotated-optical light beams, having p and s components or intensity-modulated light beams. The detector includes means for receiving and splitting the modulated light beam into two beams respectively clear in the p and s components. The differential detector means intercepts the two beams and is responsive to the two beams to supply an output signal indicative of the relative polarization rotations of the p and s components. Control means are connected to the detector means for inhibiting response to one of the two beams, whereby intensity modulation of the only one of the two beams supplied as an output signal.

The foregoing and other objects, features and advantages of the invention will be apparent from the following more particular description of preferred embodiments of the invention, as illustrated in the accompanying drawings.

DETAILED DESCRIPTION

Figure 1:
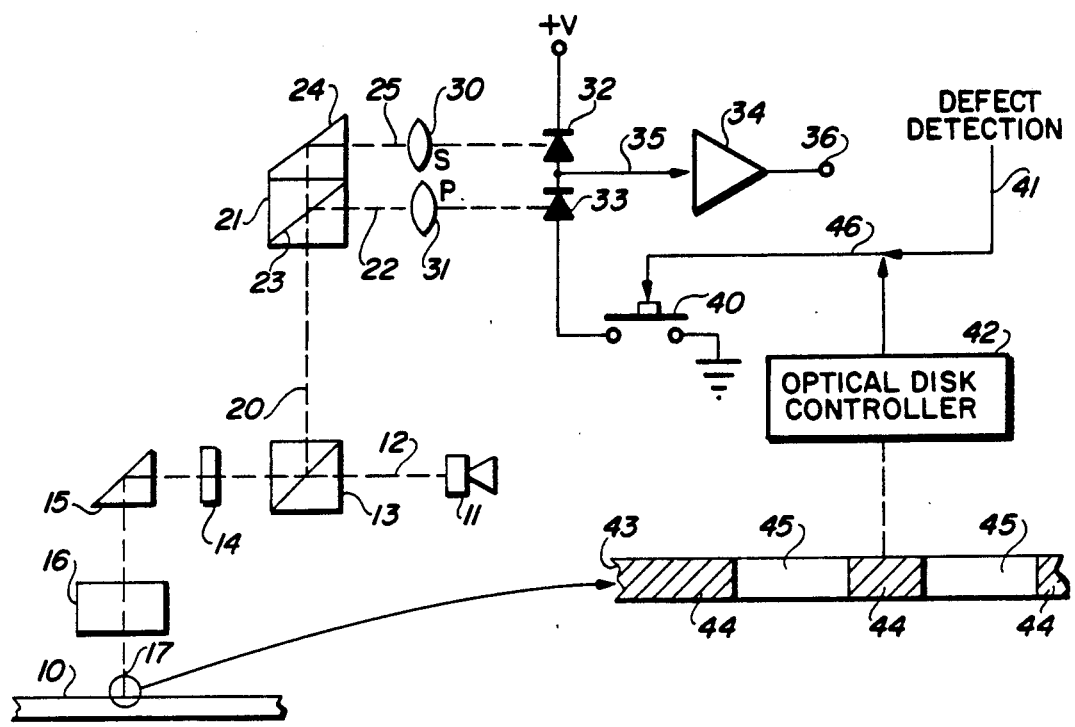
FIG. 1 is a simplified schematic diagram, illustrating the practice of the invention and the magnetooptic recorder.

Referring now more particularly to the drawing, like numbers indicate like parts and structural features in the two figures.

A magnetooptic storage disk 10 is suitably rotated to be scanned by a laser beam supplied by a diode laser 11. Diode laser 11 is energized in the usual manner, such energization is not shown for purposes of simplicity. The laser 11 beam 12 passes through polarization beam splitter 13, thence refracted by optical plate 14 to be reflected by mirror 15 through objective lens 16, thence over light path 17 to a data storing track on magnetooptic disk 10. Disk 10 reflects the light and rotates the polarization in accordance with the remanent magnetization of the magnetooptic disk. This phenomenon is well known and not described for that reason. The reflected light goes back past the mirror 15, to be partially reflected by beam splitter 13 to follow optical path 20 to second beam splitter 21. Beam splitter 21, splits the beam on path 20 into two equal intensity portions respectively by half mirror 23 and the optical mirror 24 to travel respectively along paths 22 and 25. Polarization filters 30 and 31 respectively filter or allow to pass only the s and p components from paths 25 and 22. A pair of photodiodes 32, 33 are connected in series between a +V signal and ground reference potential. The light beams on paths 25 and 22, respectively, impinge on photodiodes 32 and 33. This described arrangement is known to provide differential detection by taking a signal over line 35 to a suitable preamplifier 34. The output of amplifier 34 goes to terminal 36 from which an electrical signal is taken for data detection, as is known in the art.

In accordance with the invention, an electronic switch 40 is interposed between the anode of diode 33 and ground reference potential. When switch 40 is closed then an electric circuit is completed between line 35 through reverse bias diode 33 to ground reference potential. In this mode, diode 33 contributes to the differential signal on line 35, such that the illustrated circuit is effective to detect polarization rotations in the received light beam received over path 20. For detecting intensity-modulated beams, electric switch 40 is opened for disconnecting photodiode 33 from the circuit such that only diode 32 is effective to detect signals. The intensity-modulated signals going through path 22 is wasted, while the other half of intensity-modulated signal goes through path 25 to impinge on diode 32 for detection of an intensity-modulated beam. The detected intensity modulation of the beam is passed by data diode 32 through preamplifier 34 for detection by detection circuits, as indicated by numeral 36.

An application of the invention is found in the use of hard-sectored magnetooptic disks. Hard-sectoring is usually provided by molding surface undulations to identify the sectors boundaries and leaving the space between the surface undulated sector marks for recording user signals in a magnetooptic disk or storage member 10. Numeral 43 denotes a track from storage number 10. Hard-sector areas include embossed sector marks, track and sector identification, called an ID field 44, which includes hard-sectored areas 44 with interposed magnetooptic smooth surface areas 45. Optical disk controller (ODC) 42 decodes the signals read from each ID field 44 or MO field 45 for setting switch 40 to the position for the next encountered zone, i.e., MO or embossed (intensity-modulated) signals. ODC 42 is a usual controller found in optical disk devices.

ODC 42 supplies a switch-closing signal over line 46 for closing electronic switch 40 for enabling detection of a polarization-modulated light beam reflected from areas 45. In a similar manner, when ID fields 44 are being scanned, ODC 42 supplies a switch-opening signal over line 46 for enabling detecting the intensity modulation caused by the surface undulations of the ID field 44.

The present invention can also be used for defect detection, which results in intensity modulation of the reflected light beam; i.e., a defect that reflects a low-intensity light, while a good area of the surface reflects high-intensity light to intensity modulate an impinging light beam. A signal, travelling over line 41 opens switch 40 for enabling defect detection, such as used for surface analysis of storage member 10. Also, defect detecing can be achieved during erase cycles for MO field 45, such as shown in co-pending commonly-assigned application for patent Ser. No. 239,863 filed Sept. 2, 1988 by Kalakowski et al, now U.S. Pat. No. 4,941,139.

While electronic switch 40 is shown for deactivating a diode 33, electronic shutters may be imposed in the light paths 22 or 25 for blocking the light from reaching a photodiode, such electronic shutters operate quickly as does electronic switch 40.

Figure 2:
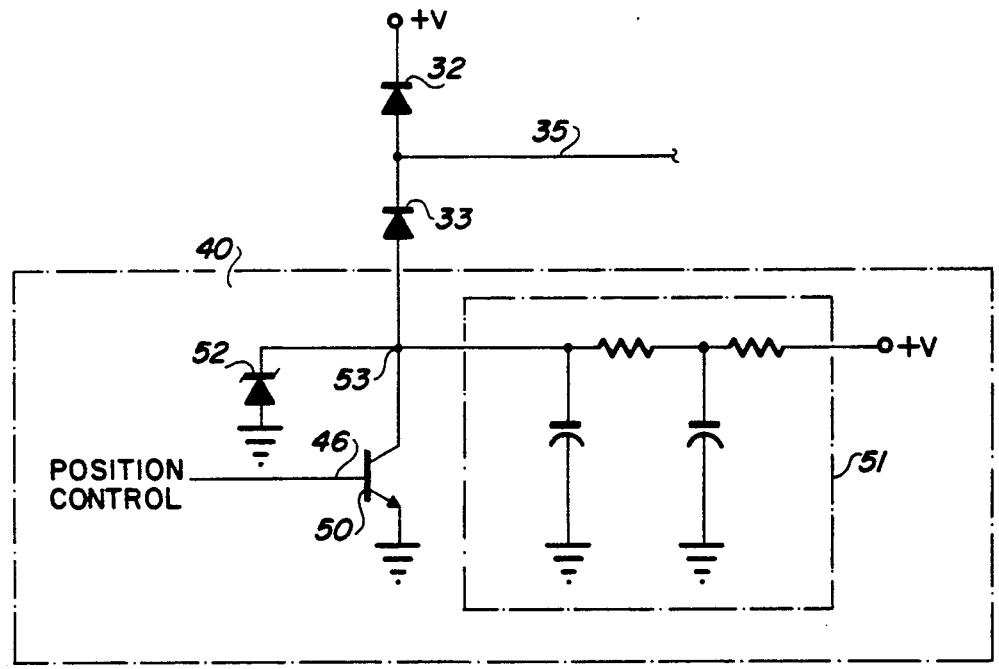
FIG. 2 is a simplified circuit diagram showing one embodiment of an electronic switch used in connection with the FIG. 1-illustrated circuits.

FIG. 2 shows one constructed embodiment of electronic switch 40 connected to the anode of a photodiode 33, a NPN transistor 50 has its base electrode connected to line 46, its emitter electrode connected to ground reference potential, and its collector connected to the anode of photodiode 33. The Zener diode 52 may be inserted as shown for limiting the positive voltage excursions at the junction 53 between the collector of NPN transistor 50 and the anode of photodiode 33. A plus voltage source is connected through a low-pass filter 51 to junction 53.

While the invention has been particularly shown and described with reference to preferred embodiments thereof, it will be understood by those skilled in the art that various changes in form and details may be made therein without departing from the spirit and scope of the invention.

What is claimed is:

1. An optical detector for detecting either polarization rotated optical light beams having p and s components or intensity-modulated light beams;

the improvement including, in combination:
means for receiving and splitting the modulated light beam into two beams respectively carrying the p and s components;
differential detector means positioned to intercept the two beams and being responsive to the two beams to supply an output respectively in the p and s components; and
control means connected to the detector means for inhibiting response to a first one said two beams whereby intensity modulation of a second one of said two beams is supplied as said output signal.

2. In the apparatus set forth in claim 1, further including, in combination:
said differential detector including first and second optical beam detection elements and said control means being electrically connected to one of said optical beam detection elements to disable said one optical beam detection means from supplying any signal.

3. In the apparatus set forth in claim 2, further including, in combination:
said first and second optical beam detection elements are photodiodes connected in series, voltage means connected to the photodiodes for reverse biasing same, switch means connected between one of said photodiodes and said voltage means and being connected to said control means for responding to same to close the switch for detecting said polarization-modulated light beam and to open the switch for disabling the one photodiode for enabling the other photodiode to detect an intensity-modulated light beam.

4. In the apparatus set forth in claim 3, further including, in combination:
a hard-sectored optical storage member having data storing areas for magnetooptically storing information-bearing signals with sector marks having surface undulating portions disposed between the data storing areas which indicate boundaries between the data storing areas;
means for supplying a reading light beam to the storage member such that light reflected from the storage member is directed to said receiving and splitting means for detecting any modulation of the reading light beam by the storage member;
sensing means operatively coupled to the storage member for indicating when a reading light beam is to scan a data area or to scan a sector mark and being connected to said control means for actuating the control means to effect sensing of polarization-modulated light beam when the reading light beam is scanning a one of the data areas and to effect sensing of intensity-modulated light beam when the reading light beam is scanning a one of the sector marks.

5. In the apparatus set forth in claim 4, further including, in combination:
transistor means comprising said switch, a low-pass filter connecting the voltage source to a junction between said one photodiode and said transistor means and a Zener diode connected to the junction for limiting the voltage excursions thereon.

6. In a machine-effected method of detecting modulation of a light beam, including the machine-executed steps of:
receiving the modulated light beam;
ascertaining whether the modulated light beam is polarization modulated or intensity modulated;
when the modulated light beam is polarization modulated, arranging a detector having two photodiodes to be differentially configured and arranging an optical system for separating s and p components to be supplied to said two photodiodes, respectively, and taking an output signal from both said photodiodes; and
when the modulated light beam is intensity modulated, arranging the detector such that one of the two photodiodes supplies a signal and taking the output signal from the one photodiode.

7. In the machine-effected method set forth in claim 6, further including the machine-executed steps of:
receiving an optical disk which records first data signals in smooth magnetooptic areas and second data signals separated by surface perturbed marks; and
reading the data signals and taking the output signal from both the photodiodes and reading the surface perturbed marks and taking the output signal from the one photodiode.

8. An optical detection apparatus, comprising, in combination:
detecting means for detecting optical signals representing both polarization modulation and intensity modulation carried in a received light beam;
polarization modulation detection means in the detecting means for detecting rotated linear polarization modulation of light in the received light beam in two portions, said portions respectively for detecting oppositely-rotated light polarization modulations;
detection conversion means connected to the modulation detection means for selectively inhibiting one of said two portions of the modulation detection means such that a portion other than said one portion detects the optical signals as intensity modulated signals.

9. In the apparatus set forth in claim 8 further including, in combination:
said modulation detection means includes a differential detection circuit having two inputs respectively connected to the two portions for receiving detected signals therefrom for comparing the received signals to produce an output signal representative of the polarization rotation of the optical signals and when said one portion is inhibited for supplying said output signal as a function of said other portion supplied signal.

10. In the apparatus set forth in claim 9 further including, in combination:
beam splitting means for splitting the received light beam into two sub-beams and respectively supplying the sub-beams to said two portions;
said one portion including a polarization filter for passing first rotated polarization light, a first photodetector optically coupled to the filter for receiving and detecting light intensity of the passed first rotated polarization light;
said other portion including a polarization filter for passing second rotated polarization light which is rotated in an opposite rotational sense to the first rotated polarization light, a second photodetector optically coupled to the other portion filter for receiving and detecting light intensity of the passed second rotated polarization light; and
said differential circuit two inputs being respectively electrically connected to said photo-diodes.

11. In the apparatus set forth in claim 10 further including, in combination:
said conversion means including means connected to said second photo-diode for inhibiting and enabling the photo-diode to supply a signal to a one of said inputs of the differential circuit.

12. In the apparatus set forth in claim 10 further including, in combination:
said conversion means including means operative to block or pass a sub-beam to said second photodetector.

* * * * *